United States Patent [19]

Hagarty

[11] 4,008,708  
[45] Feb. 22, 1977

[54] SOLAR ENERGY COLLECTOR

[75] Inventor: Robert W. Hagarty, Cambridge, Canada

[73] Assignee: Dow Corning Corporation, Midland, Mich.

[22] Filed: Sept. 29, 1975

[21] Appl. No.: 617,553

[52] U.S. Cl. .............................. 126/270; 126/271
[51] Int. Cl.² ............................................ F24J 3/02
[58] Field of Search ............ 126/270, 271; 237/1 A

[56] References Cited

UNITED STATES PATENTS

| | | | |
|---|---|---|---|
| 3,076,450 | 2/1963 | Gough et al. .................. | 126/271 |
| 3,200,820 | 8/1965 | Garrett ........................... | 126/271 |
| 3,859,980 | 1/1975 | Crawford ....................... | 126/271 |
| 3,918,430 | 11/1975 | Stout et al. ................... | 126/271 |
| 3,943,911 | 3/1976 | Yu .................................. | 126/271 |

FOREIGN PATENTS OR APPLICATIONS 325,928  3/1930  United Kingdom ............... 126/271

Primary Examiner—Kenneth W. Sprague
Attorney, Agent, or Firm—Howard W. Hermann

[57] ABSTRACT

A solar energy collector is made up of a plurality of flexible sheets separated by a plurality of extruded flexible spacer members adhered to the sheets in parallel spaced relationship forming channels between the spacer members. The bottom sheet or middle sheet is light absorbing while the top sheet or sheets are light transmitting and all of the sheets and spacer members are desirably formed of silicone rubber or resin, the sheets being reinforced with glass fiber mesh if desired.

4 Claims, 1 Drawing Figure

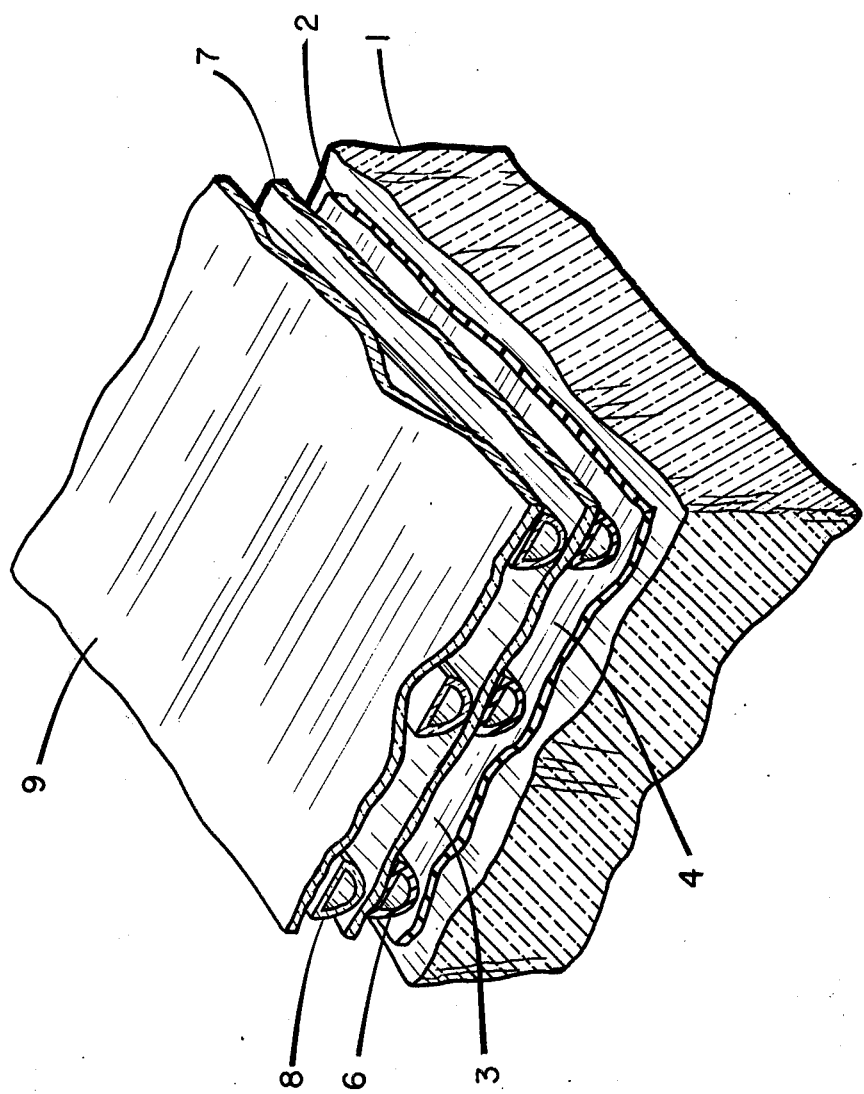

SOLAR ENERGY COLLECTOR

BACKGROUND OF THE INVENTION

The present invention relates to solar energy collectors and particularly to solar windows and solar energy absorbing elements which make use of fluids as a heat transfer medium.

Many systems have been proposed for collecting and converting energy from the sun as an alternative to the use of fossil fuels for energy generation. With rising costs of fossil fuels the collection of solar energy provides an attractive alternative. However, a major drawback so far of large scale solar energy use has been the initial cost of installation and relative inefficiencies of collection. Glass elements are difficult to fabricate and are subject to breakage due to vandalism, accident during installation, breakage by hail storms, and cracking due to heat differentials caused by shadows. Furthermore, they are heavy and require substantial labor in construction. Although flexible elements have been tried in the past wind damage and degradation due to exposure to the sun have been problems. Although various configurations using plastic materials have been proposed none to date have been commercially significant. The present invention is directed toward providing a simple inexpensive durable solar energy collector panel.

SUMMARY OF THE PRESENT INVENTION

The present invention is directed to a solar energy collector panel in which flexible sheets, desirably of silicone rubber or resin material, are spaced from one another by a plurality of parallel spaced extruded members which desirably are also silicone rubber. The extruded spacers provide therebetween channels for insulation and channels for the passage of fluid heat transfer medium such as water or air to carry energy from the collector to a point of utilization. The entire device is easily fabricated by calendaring the silicone rubber or silicone resin sheets of transparent material for light transmitting portions and light absorbing material for the absorbent portion of the collector, and adhering the sheets to the extruded spacers with silicone sealant to provide an integral device. The collector element along with its insulative window can be simply rolled up and laid out by installers at the point where it is to be used. Installation personnel can safely walk on the panels during installation with little danger of breakage. Silicone materials by their nature are extremely resistant to the effects of weather and do not degrade as many other polymeric materials do. Thus, installation can take place with a minimum of labor and care and little maintenance is required after installation. The panel may be laid directly on the roof of a building or even over uneven ground, preferably with a layer of insulation laid under the panels.

BRIEF DESCRIPTION OF THE DRAWINGS

Other objects and attendant advantages of the present invention will become apparent to those skilled in the art from a study of the following detailed description when read in connection with the accompanying drawing, the sole FIGURE thereof is a view in perspective of a solar energy collector element embodying the present invention.

DESCRIPTION OF PREFERRED EMBODIMENTS

Referring now to the drawing there is shown in the sole FIGURE thereof a perspective view of a solar energy collector laid on an insulative body 1 which may be, for example, a layer of foam insulation on the roof of a building. The solar energy collector proper is simply laid on top of the insulation or in the case of a well insulated building may be laid directly on the roof panels without further insulation beneath.

The collector proper as shown in the drawing comprises a sheet of solar energy absorbing flexible material 2 at the bottom thereof which is preferably made of a pigmented silicone rubber and over which an energy absorbing fluid is passed through a plurality of channels 3 and 4 defined by a plurality of spaced D-shaped tubular spacer elements 6 which are adhered to the absorber 2 by means of a silicone sealant. The spacer elements 6 are desirably also made of pigmented silicone rubber but may be made of transparent silicone rubber with a relatively small loss in efficiency. In both the sunlight absorbing sheet 2 and the spacer elements 6 the pigment should be chosen for maximum solar energy absorption and may be, for example, a combination of ferric oxide and carbon black.

Adhered to the top surface of the spacer members 6 is a light transmitting sheet 7 of relatively clear silicone rubber. Alternatively a silicone resin may be used. Clear silicone rubber and resin materials comprising organopolysiloxanes reinforced with finely divided silica are commercially available. If desired, the sheet 7 may be reinforced with a mesh of glass fibers for added strength. Such sheets can be made by simply calendering the silicone rubber on the glass fiber mesh.

Desirably, added insulation is provided on top of the solar energy collector per se to prevent heat loss to the atmosphere surrounding the collector. For this reason, it is commonplace to provide an air space above the collector which is closed by a second light transmitting panel spaced from the first. In accordance with the embodiment shown a second plurality of extruded flexible spacer members 8 which may be identical to the members 6 but should be of light transmitting material for heat efficiency are adhered in spaced parallel relationship over the outside surface of the light transmitting panel 7. Adhered to the outside surfaces of the spacer elements 8 is a second light transmitting panel or solar window element 9 which may be identical to the light transmitting panel 7. Alternatively, the panel 9 can be reinforced with a glass fiber mesh as described in connection with the panel 7 while the panel 7 is non-reinforced because it is not exposed to the elements. In the embodiment wherein the solar window panel 9 is made of reinforced material it is desirable that the sheet 7 be made of non-reinforced silicone rubber for ease in rolling the completed article, making it easier to handle. The pair of light transmitting panels 7 and 9 separated by the spacers 8 thus form a solar window for the energy absorption portion of the collector comprising the channels 3 and 4 on the energy absorbing panel 2.

Instead of making the panel 7 covering the channels of light transmitting material, this panel can be pigmented to make it light absorbing. In such case the heat absorbed by the panel is carried to the liquid or gas in the channels by conduction from the panel and the fluid absorbs no energy directly from solar energy impinging on it. In such case it is desirable to add an additional solar window sheet above the configuration to provide further thermal insulation.

The entire element as described is easily manufactured and requires a minimum of labor. The materials are readily available, and extrusion and calendering techniques for silicone rubber are well known and simple. The adherence of the solar window to the collector by means of the spacers prevents wind damage to the window element. The entire unit is sufficiently flexible so that it can be rolled up for easy transportation to a job site and is sufficiently rugged to enable workers to walk on the panels during installation of the necessary plumbing connections for interconnecting panels as desired and connecting the fluid output of the panels to a suitable heat utilization device.

While materials other than silicones can be used, at present the silicones have advantages over most other materials in their ability to withstand heat and the effects of sunlight without degradation. While the spacer elements have been described as D-shaped it should be realized that other configurations of either hollow or solid extruded spacer elements can also be used. It should be further realized that the solar window described in connection with the collector can be utilized with other types of collector elements than that shown.

Obviously other modifications and variations of the invention will become obvious to those skilled in the art from a consideration of the foregoing. Therefore, it is to be understood that within the scope of the appended claims the invention can be practiced otherwise than as specifically described.

That which is claimed is:

1. A solar energy collector comprising a first sheet of flexible material,
    a plurality of extruded flexible spacer members adhered to the bottom of said first sheet in substantially parallel spaced relationship, and
    a second sheet of flexible material adhered to the bottoms of said spacer members,
    whereby said spacer members and said sheets define a plurality of parallel fluid paths for passage of heat absorbing fluid therethrough to transmit heat from said collector;
    and further comprising a second plurality of extruded flexible spacer members adhered to the top of said first sheet in substantially parallel spaced relationship, and
    a third sheet of solar energy transmitting material adhered to the tops of said second plurality of spacer members.
2. A solar energy collector as defined in claim 1 wherein said third sheet and said second plurality of spacer members comprise transparent silicone rubber.
3. A solar energy collector as defined in claim 2 wherein said third sheet is reinforced with a mesh of glass fibers.
4. A solar energy collector as defined in claim 1 wherein said spacer members are hollow tubular members.

* * * * *

UNITED STATES PATENT AND TRADEMARK OFFICE
CERTIFICATE OF CORRECTION

PATENT NO. : 4,008,708

DATED : February 22, 1977

INVENTOR(S) : Robert W. Hagarty

It is certified that error appears in the above-identified patent and that said Letters Patent are hereby corrected as shown below:

Column 2, line 44, the word "heat" should read --best--.

Signed and Sealed this

Third Day of March 1981

[SEAL]

Attest:

RENE D. TEGTMEYER

Attesting Officer

Acting Commissioner of Patents and Trademarks